US012566407B2

(12) United States Patent
Rochat

(10) Patent No.: US 12,566,407 B2
(45) Date of Patent: Mar. 3, 2026

(54) DEVICE FOR AUTOMATIC WINDING OF A BARREL SPRING OF A HOROLOGICAL MOVEMENT

(71) Applicant: Montres Breguet S.A., L'Abbaye (CH)

(72) Inventor: Jean-Philippe Rochat, Les Bioux (CH)

(73) Assignee: Montres Breguet S.A., L'Abbaye (CH)

( * ) Notice: Subject to any disclaimer, the term of this patent is extended or adjusted under 35 U.S.C. 154(b) by 375 days.

(21) Appl. No.: 18/310,052

(22) Filed: May 1, 2023

(65) Prior Publication Data

US 2023/0408978 A1 Dec. 21, 2023

(30) Foreign Application Priority Data

Jun. 21, 2022 (EP) .................................... 22180159

(51) Int. Cl.
*G04B 5/02* (2006.01)
*G04B 13/02* (2006.01)

(52) U.S. Cl.
CPC ............... *G04B 5/02* (2013.01); *G04B 13/02* (2013.01)

(58) Field of Classification Search
None
See application file for complete search history.

(56) References Cited

U.S. PATENT DOCUMENTS 6,409,379 B1 * 6/2002 Gabathuler .......... G04B 11/008 368/150
2015/0198925 A1 * 7/2015 Cornibe ............... G04B 11/006 368/207
2016/0363908 A1 * 12/2016 Kirchhof .................. G04B 5/02
2022/0187767 A1 * 6/2022 Robuschi ................. G04B 5/08

FOREIGN PATENT DOCUMENTS

EP 2 897 000 A1 7/2015
EP 3 104 232 A1 12/2016

OTHER PUBLICATIONS

European Search Report issued Oct. 4, 2022 in European Application 22180159.0 filed on Jun. 21, 2022, 3 pages (with English Translation of Categories of Cited Documents).

* cited by examiner

*Primary Examiner* — Regis J Betsch
*Assistant Examiner* — Michael James Walker
(74) *Attorney, Agent, or Firm* — Oblon, McClelland, Maier & Neustadt, L.L.P.

(57) ABSTRACT

A device for automatic winding of a barrel spring of a watch includes an oscillating mass, an entry disk kinematically linked to the oscillating mass, two reduction disks and a ratchet driving disk, each reduction disk including a reduction wheel bearing at least four planetary wheels, and a transmission pinion about which the reduction wheel is loosely mounted, the entry disk being kinematically linked to the two reduction wheels such that, regardless of the direction of rotation in which it is driven by the oscillating mass, it rotates the two reduction wheels in mutually different directions, the planetary wheels forming, in each of the reduction disks, ratchets to connect in rotation the transmission pinion and the reduction wheel only when the reduction wheel pivots in a predefined direction of rotation, the predefined direction of rotation being identical for either of the reduction wheels.

7 Claims, 2 Drawing Sheets

DEVICE FOR AUTOMATIC WINDING OF A BARREL SPRING OF A HOROLOGICAL MOVEMENT

CROSS-REFERENCE TO RELATED APPLICATION

The present application claims priority to European Patent Application No. 22180159.0, filed on Jun. 21, 2022, the entire content and disclosure of which are incorporated by reference herein.

TECHNICAL FIELD OF THE INVENTION

The invention relates to the field of horological movements, and relates in particular to a device for automatic winding of a watch.

Technological Background

Devices for automatic winding of a barrel spring of a watch are known to enable the transmission of a torque to a barrel ratchet with a view to winding said spring, regardless of the direction of rotation of the oscillating mass.

Coupling disk mechanisms are well-known from the prior art. They include two coupling disks each composed of a wheel loosely mounted about a pinion and bearing a ratchet. The wheels of the coupling disks are in mesh with one another, and one of said wheels, or "first wheel", meshes with an entry disk rigidly connected in rotation with the oscillating mass. The pinions are in mesh with an exit disk cooperating with the barrel ratchet in rotation.

When the oscillating mass pivots in a first direction, it rotates the first wheel in a second direction, and the ratchet borne therein is configured to rigidly connect in rotation said first wheel and the pinion about which it is mounted. Said pinion then transmits a torque to the exit disk so as to rotate it in the first direction. At the same time, the first wheel rotates the second wheel in the first direction, and the ratchet borne by said second wheel disconnects the rotation thereof from that of the pinion about which it is mounted, said pinion being rotated in the second direction by the output disk.

On the contrary, when the oscillating mass pivots in a second direction, it rotates the first wheel in the first direction, the ratchet borne therein disconnecting in rotation said first wheel and the pinion about which it is mounted. At the same time, the first wheel rotates the second wheel in the second direction, and the ratchet borne therein connects the rotation thereof with that of the pinion about which it is mounted, said pinion then rotating the output disk in the first direction.

In a known manner, the barrel spring can also be wound manually, by actuating a winding stem kinematically linked to the barrel ratchet, such that the rotation thereof, said winding stem rotates said ratchet.

During the rotation of the winding stem, the barrel ratchet rotates the pinions of the coupling disks via the exit disk. During this rotation of the pinions, the ratchets of each of the two wheels of said coupling disks are used so as to disconnect said pinions in rotation from said wheels.

Due to the reduction ratio between the barrel ratchet, the exit disk, and the pinions, the ratchets are subjected to very substantial angular velocities, which is the source of lubrication problems and premature wear of said ratchets.

Furthermore, these coupling disk mechanisms have the drawback of giving rise to substantial mechanical gaps between the ratchets and the teeth of the pinions of the coupling disks upon changes of direction of rotation of the wheels of the coupling disks. These gaps, referred to as "dead zones" by a person skilled in the art, generate noises, shocks, vibrations and premature wear of the moving parts causing these gaps. The dead zone also reduces the capacity of the winding device to wind the barrel because, while the mass travels through this dead zone, it cannot be used to wind the barrel.

The dead zone increases as the reduction ratio between the oscillating mass and the wheels of the coupling disks increases.

The documents EP3104232A1 and EP2897000A1 disclose devices for automatic winding of a barrel spring.

SUMMARY OF THE INVENTION

The invention solves the drawbacks cited above and relates to this end to a device for automatic winding of a barrel spring of a watch, comprising an oscillating mass, an entry disk kinematically linked to the oscillating mass, two reduction disks and a ratchet driving disk. Each reduction disk includes a reduction wheel bearing at least four planetary wheels, and a transmission pinion about which the reduction wheel is loosely mounted. The entry disk is kinematically linked to the two reduction wheels such that, regardless of the direction of rotation wherein it is driven by the oscillating mass, it rotates the two reduction wheels in mutually different directions. The planetary wheels comprise teeth of asymmetric shape, so as to form ratchets configured to connect in rotation, in each of said reduction disks, the transmission pinion and the reduction wheel only when said reduction wheel pivots in a predefined direction of rotation, said predefined direction of rotation being identical for either of the reduction wheels.

In specific embodiments, the invention can further include one or more of the following features, which must be considered singly or according to any combination technically possible.

In specific embodiments, the entry disk and the reduction wheels are dimensioned such that, between the oscillating mass and the reduction wheels, a reduction ratio greater than or equal to 1:3 is generated, and/or the transmission pinions and the ratchet driving disk are dimensioned such that the geartrain formed between said transmission pinions and the ratchet, or the ratchet driving disk, has a reduction ratio less than or equal to 1:50.

In specific embodiments, one of the reduction wheels is in mesh with the entry disk and with the other reduction wheel.

In specific embodiments, the reduction disks are identical to one another.

In specific embodiments, the transmission pinions include a first toothing cooperating with the planetary wheels and a second toothing cooperating with the ratchet driving disk.

In specific embodiments, the first toothing includes more teeth than the second toothing.

In specific embodiments, in each reduction disk, the planetary wheels are distributed regularly about the transmission pinion and are each arranged in mutually different angular positions about the respective axes of rotation thereof.

BRIEF DESCRIPTION OF THE FIGURES

Other features and advantages of the invention will become apparent upon reading the following detailed description given by way of a non-limiting example, and with reference to the accompanying drawings, in which.

It should be noted that the figures are not necessarily drawn to scale for clarity purposes.

DETAILED DESCRIPTION OF THE INVENTION

Figure 1:
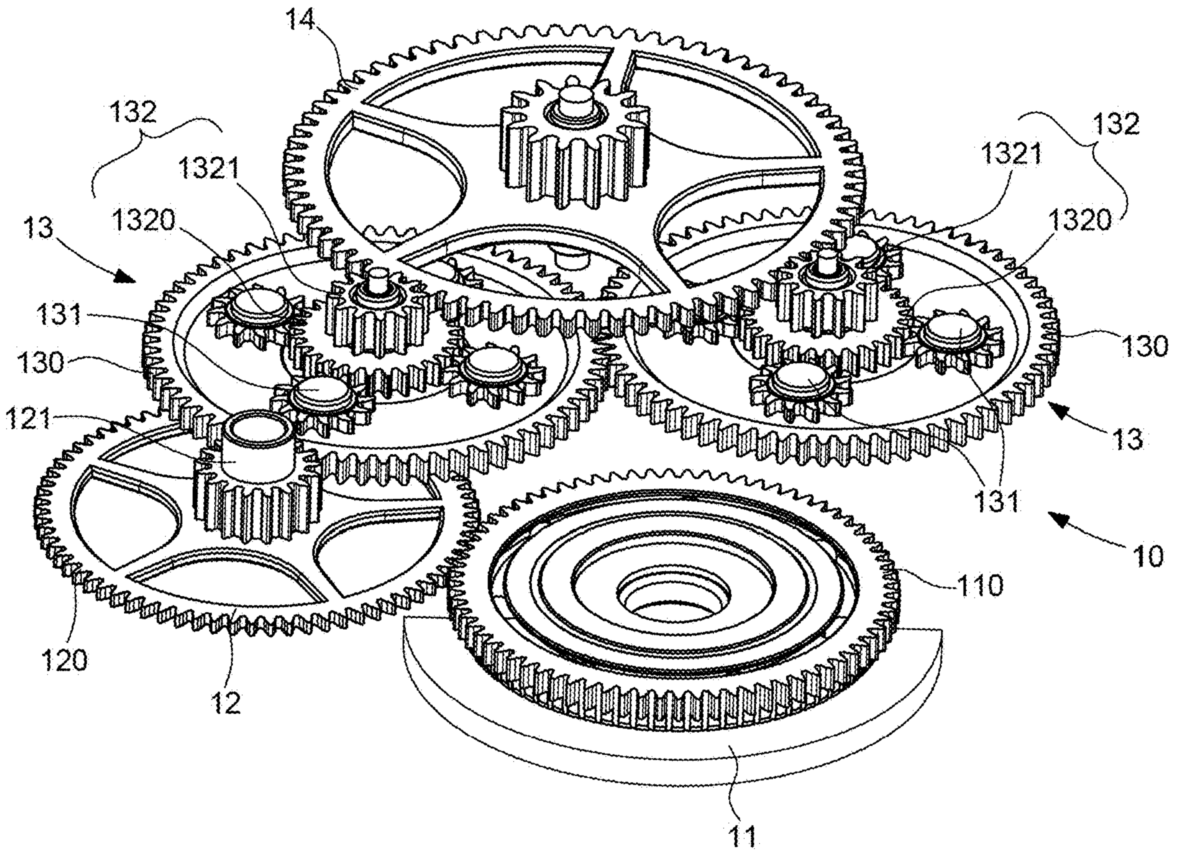
FIG. 1 shows a perspective view of a device for winding a barrel spring of a watch according to a preferred embodiment example of the invention.

FIG. 1 shows a device 10 for automatic winding a barrel spring of a watch according to a preferred embodiment example. As seen in this figure, the winding device 10 comprises an oscillating mass 11, an entry disk 12 in mesh with the oscillating mass 11, two reduction disks 13 and a ratchet driving disk 14 intended to cooperate with a ratchet (not shown in the figures).

The entry disk 12 is kinematically linked, by an entry wheel 120 with which it is equipped, with the oscillating mass 11 such that when the latter pivots, it rotates said entry disk 12. Preferably, the entry wheel 120 is meshed, to this end, with a driving wheel 110 rigidly fastened to the oscillating mass 11, i.e., with no degree of freedom. The driving wheel 110 includes, in the preferred embodiment example of the invention, an identical number of teeth to that of the entry wheel 120.

The entry disk 12 furthermore includes a pinion 121 about which the entry wheel 120 is rigidly fastened, intended to transmit a rotation movement of said entry disk 12 to one of the reduction disks 13 with which it is meshed.

In particular, each reduction disk 13 includes a reduction wheel 130 bearing at least four planetary wheels 131, and a transmission pinion 132 about which the reduction wheel 130 is loosely mounted, i.e. with a degree of freedom in rotation. As shown in FIG. 1, the entry disk 12 is kinematically linked to the two reduction wheels 130 such that, regardless of the direction of rotation wherein it is driven by the oscillating mass 11, it rotates the two reduction wheels 130 in mutually different directions. To this end, in the preferred embodiment example of the invention as shown in FIG. 1, one of the reduction wheels 130 is in mesh with the entry disk 12, in particular with the pinion of the entry disk 12, and with the other reduction wheel 130.

Preferably, as seen in FIG. 1, the reduction disks 13 are identical to one another. Thus, the manufacture and assembly of the device are facilitated, and economies of scale can be made.

Figure 2:
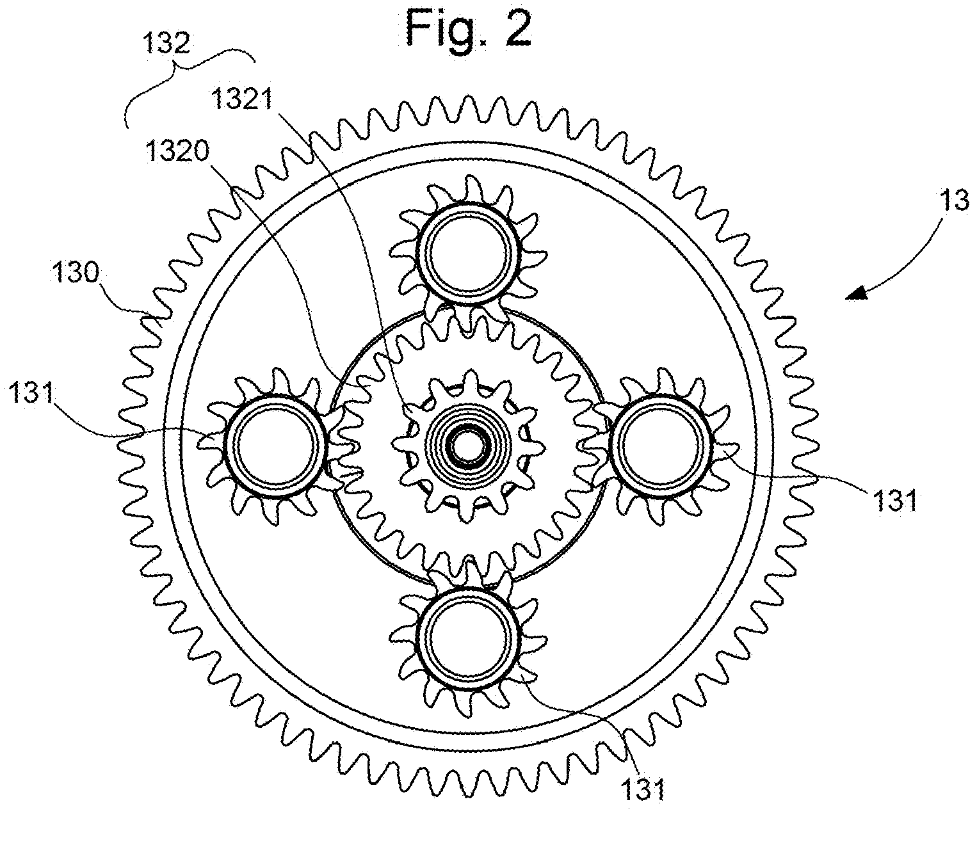
FIG. 2 shows a top view of a reduction disk of the device of FIG. 1.
Figure 3:
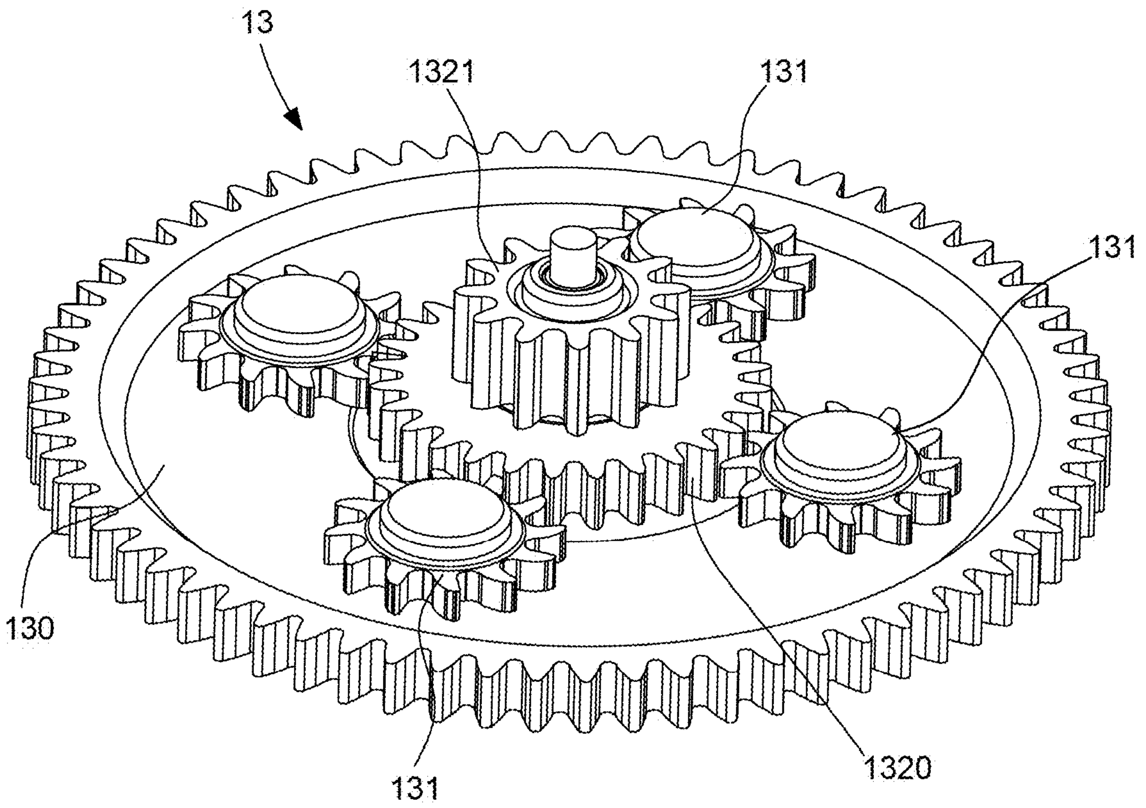
FIG. 3 shows a perspective view of the reduction disk of FIG. 2.

FIGS. 2 and 3 show in detail a reduction disk 13 according to the preferred embodiment example of the present invention.

As shown in FIG. 2, the planetary wheels 131 form, in each of the reduction disks 13, ratchets configured to rigidly connect in rotation the transmission pinion 132 and the reduction wheel 130 only when said reduction wheel 130 pivots in a predefined direction of rotation, here the clockwise direction. In particular, when the reduction wheel 130 pivots in the clockwise direction, one of the planetary wheels 131 is locked in rotation against the transmission pinion 132 and applies a torque to teeth of the transmission pinion 132 with which it cooperates, which gives rise to the rigid connection in rotation of the transmission pinion 132 and the reduction wheel 130.

This technical effect is particularly due to the asymmetric shape of the teeth of the planetary wheels 131. In particular, when one of the planetary wheels 131 is locked in rotation, as shown on the right in FIG. 2, the tip of one of the teeth thereof is arranged bearing against the head of an opposite tooth of the transmission pinion 132, said head then forming a banking.

Conversely, when the reduction wheel 130 pivots in the anti-clockwise direction, the planetary wheels 131 mesh with the transmission pinion 132, such that said reduction wheel 130 rotates about said transmission pinion 132 without applying a torque thereto, i.e. without rotating it.

Advantageously, the reduction disks 13 being identical to one another, the predefined direction of rotation wherein the planetary wheels 131 rigidly connect in rotation the reduction wheel 130 and the transmission pinion 132 is identical for either of the reduction wheels 130. The reduction wheels 130 being each rotated in different directions during the rotation of the oscillating mass 11, regardless of the direction thereof, one of the transmission pinions 132 is driven to pivot in the predefined direction, i.e. the clockwise direction.

In particular, in the preferred embodiment example of the invention, the transmission pinions 132 include a first toothing 1320 cooperating with the planetary wheels 131 and embodying a sun gear, and a second toothing 1321 cooperating with the ratchet driving disk 14, the first toothing 1320 including a greater number of teeth than that of the second toothing 1321. The first and second toothings 1320 and 1321 are advantageously fastened on the same shaft and are fixed in rotation in relation to one another. In the figures, these first and second toothings 1320 and 1321 are represented schematically by the reference cylinders thereof.

Advantageously, in each reduction disk 13, the planetary wheels 131 are distributed regularly about the transmission pinion 132 and are each arranged in mutually different angular positions, about the respective axes of rotation thereof. As seen in FIG. 2, each planetary wheel 131 has a different orientation so that the engagement of the teeth of the planetary wheels 131 between the teeth of the transmission pinion 132 is different for each of said planetary wheels 131. This is such that, upon a change of direction of rotation of the reduction wheel 130, the mechanical gap existing between the teeth of the planetary wheel 131 which will apply a torque to the teeth of the transmission pinion 132, in particular of the first toothing 1320, and the latter, i.e. the dead zone, is minimised. Moreover, the dead zone is also reduced thanks to the number of planetary wheels 131.

Preferably, the entry disk 12 and the reduction wheels 130 are dimensioned such that between the oscillating mass 11 and the reduction wheels 130 a reduction ratio greater than or equal to 1:3 is generated, preferably a reduction ratio of 1:5. Moreover, the transmission pinions 132 and the ratchet driving disk 14 are dimensioned such that the geartrain formed between said transmission pinions 132 and the ratchet, or between said transmission pinions 132 and the ratchet driving disk 14, has a reduction ratio less than or equal to 1:50, preferably a reduction ratio equal to 1:25.

The invention has hence the advantage of limiting the rotational speed of the planetary wheels 131 for a given rotational speed of the oscillating mass 11 in the case of automatic winding and for a given rotational speed of the ratchet in the case of manual winding via a winding stem. Such a disposition makes it possible to extend the service life of the planetary wheels 131 while suppressing any vibrations liable to result from an excessive rotational speed.

The arrangement and dimensioning of the entry disks 12, the reduction wheels 130, the transmission pinion 132 and the ratchet driving disk 14 as described above are advantageously enabled by reducing the dead zone resulting from the number of planetary wheels 131.

More generally, it should be noted that the implementations and embodiments considered above have been described by way of non-limiting examples, and that other alternatives are thus possible.

In particular, the planetary wheels 131 have been described in the form of toothed wheels in the present document, but they can take the form of any other type of ratchet. Moreover, the winding device 10 according to the invention can include other reducing disks and the entry 12, reduction 13 and ratchet driving 14 disks can be arranged differently than the arrangement described and shown in the figures.

The invention claimed is:

1. A device for automatic winding of a barrel spring of a watch comprising:

an oscillating mass, an entry disk kinematically linked to the oscillating mass, two reduction disks and a ratchet driving disk, each reduction disk including a reduction wheel bearing at least four planetary wheels, and a transmission pinion about which the reduction wheel is loosely mounted, the entry disk being kinematically linked to the two reduction wheels such that, regardless of a direction of rotation in which it is driven by the oscillating mass, it rotates the two reduction wheels in mutually different directions, the planetary wheels comprising teeth of asymmetric shape, so as to form ratchets configured to connect in rotation, in each of said reduction disks, the transmission pinion and the reduction wheel only when said reduction wheel pivots in a predefined direction of rotation, said predefined direction of rotation being identical for either of the reduction wheels, wherein one of the reduction wheels is in mesh with the entry disk and with the other reduction wheel.

2. The device according to claim 1, wherein the entry disk and the reduction wheels are dimensioned such that, between the oscillating mass and the reduction wheels, a reduction ratio greater than or equal to 1:3 is generated, and wherein the transmission pinions and the ratchet driving disk are dimensioned such that a geartrain formed between said transmission pinions and the ratchet has a reduction ratio less than or equal to 1:50.

3. The device according to claim 1, wherein the entry disk and the reduction wheels are dimensioned such that, between the oscillating mass and the reduction wheels, a reduction ratio greater than or equal to 1:3 is generated, or wherein the transmission pinions and the ratchet driving disk are dimensioned such that a geartrain formed between said transmission pinions and the ratchet has a reduction ratio less than or equal to 1:50.

4. The device according to claim 1, wherein the reduction disks are identical to one another.

5. The device according to claim 1, wherein the transmission pinions include a first toothing cooperating with the planetary wheels and a second toothing cooperating with the ratchet driving disk.

6. The device according to claim 5, wherein the first toothing includes more teeth than the second toothing.

7. The device according to claim 1, wherein, in each reduction disk, the planetary wheels are distributed regularly about the transmission pinion and are each arranged in mutually different angular positions, about respective axes of rotation thereof.

* * * * *